ROBERT OWEN CARTER
INVENTOR

BY Hall & Houghton

ATTORNEY

ROBERT OWEN CARTER
INVENTOR

BY Hall & Houghton

ATTORNEY

United States Patent Office 3,405,235
Patented Oct. 8, 1968

3,405,235

SYSTEMS FOR TRANSMITTING CODE PULSES HAVING LOW CUMULATIVE DISPARITY

Robert Owen Carter, Woodford Green, Essex, England, assignor to Her Majesty's Postmaster General, London, England Filed Feb. 23, 1965, Ser. No. 434,293
5 Claims. (Cl. 178—69)

ABSTRACT OF THE DISCLOSURE

A system for transmitting groups of coded pulses in which the disparity value of successive transmitted groups of code pulses is summed, and in which the disparity value of individual groups of code pulses is maintained. The polarity of each digit of an individual group is inverted before transmission if by so doing the summed disparity value is reduced. The system also provides for the addition of an extra digit to a group whose digits have been inverted in polarity so as to indicate that polarity inversion has taken place.

Figure 1:
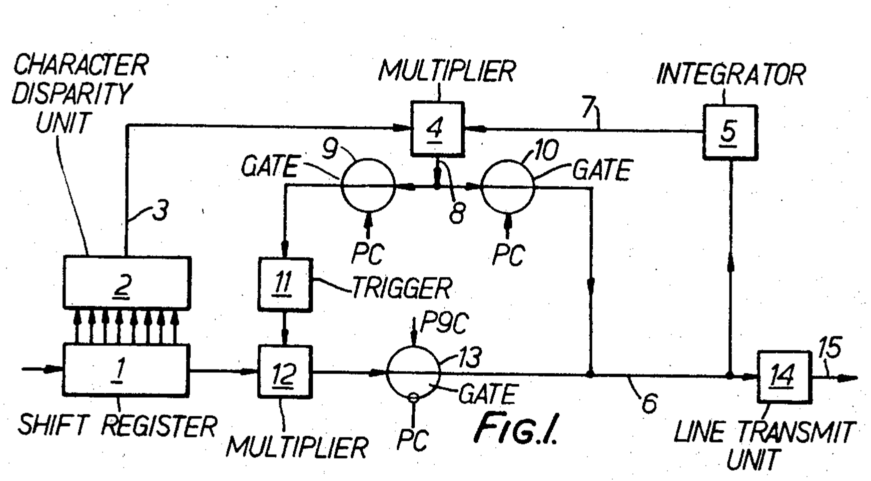

In pulse transmission systems, in particular multi-channel pulse code modulation systems, it is usual to insert digital regenerative repeaters at regular intervals in the signal transmission path, these being power-fed over the transmission path. For this reason, and also because the path may be a balanced pair and the repeater unbalanced, it is necessary to insert a transformer at the signal input to the repeater. In consequence, the D.C. component of the signal is lost. All the problems of a "wandering zero," well known in telegraphy and data transmission, have therefore to be faced. D.C. restoration circuits are an undesirable complication, and the alternative of arranging that the line signal contains little or no energy at zero or very low frequencies is usually preferred. One method is to use a method of signal transmission variously known as bipolar, alternating binary, or alternate mark inversion. In this method, a space is represented by no signal and a mark by either a positive pulse or a negative pulse, these latter occurring alternately. That method requires a repeater capable of detecting and repeating three-condition or ternary signals.

Another method is to transmit binary signals, but to use only those combinations of digits which have a low disparity, i.e. only a small marking or spacing bias. One such system intended for pulse code modulation of speech, uses groups of nine digits in which there is either 5 marks and 4 spaces or 4 marks and 5 spaces, and is called therefore a unit-disparity code. This gives 252 usable combinations nearly as many as an unrestricted 8-binary-digit system which provides 256 combinations. However, if this system has to be interconnected with another link which will accept relatively unrestricted binary signals, a code converter must be inserted, to convert unrestricted binary digits to unit-disparity code digits. Furthermore, since 252 is less than 256, it is not possible to convert all unrestricted 8-binary digit combinations to 9-digit, unit-disparity combinations.

Even if all pulse code modulation systems use unit-disparity code, the problem of code conversion will still arise if it is desired to accept, for transmission over the system, digital data in unrestricted binary code form.

According to the present invention a pulse code transmission system for binary digital signals, for example, pulse code modulation signals, includes a transmitter having a converter for receiving binary coded input signals, means for determining on a cumulative basis the disparity values of successive groups of said binary coded input signals, inverting the polarity of each code digit signal in a group if the disparity value of the inverted polarity group reduces the integrated disparity values of the preceding groups but not otherwise and adding a further digit position coded on a binary basis to indicate whether the polarity of the group has been inverted, and transmitting the groups, and a receiver for receiving the transmitted groups and including a device for examining the further digit position and sensing the binary value of the signal therein and for restoring to their original polarity the code digit signals of each inverted polarity group.

The converter may comprise a store in which the code digits of each successive group are temporarily stored.

Preferably, the further code digit position is added at the beginning of each group transmitted by the transmitter. The binary coding used for the signal in the further digit position may be a polarity coding, i.e. a mark or a space or a presence-absence coding.

The groups transmitted by the transmitter are retimed to permit the addition of the further code digit position so that for each received group of $n$ code digits the transmitted group contains space for $n+1$ digits, the total duration of the received and transmitted groups being the same. Similarly at the receiver, retiming to accommodate a change from $n+1$ to $n$ digits may be desirable.

The code used in the invention gives low disparity, although not over such a short period of time as the unit-disparity code. The code used in the invention has the advantage that conversion from and to unrestricted binary is much simpler.

Figure 2:
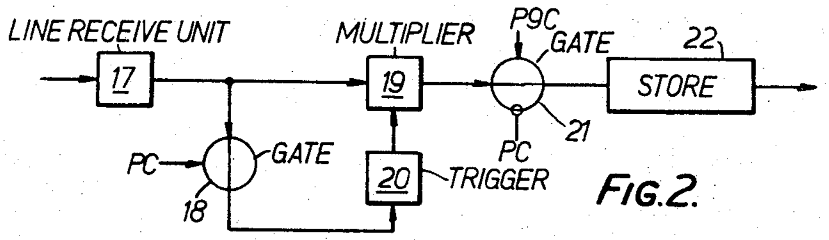
Figure 4:
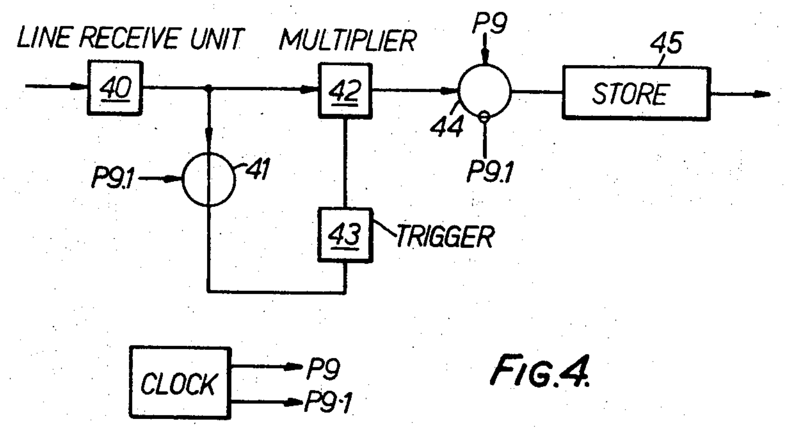
Figure 3:
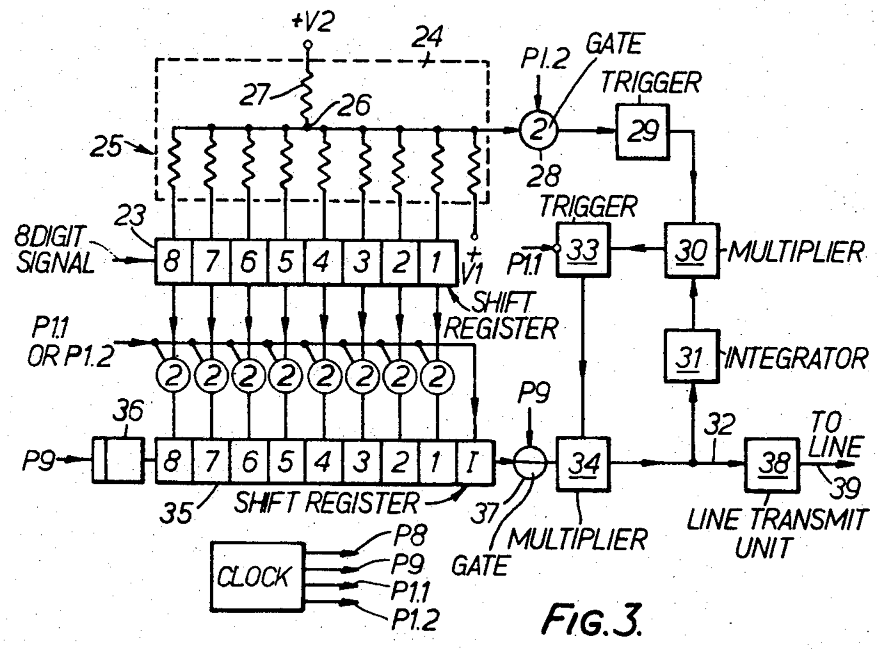
Figure 5:
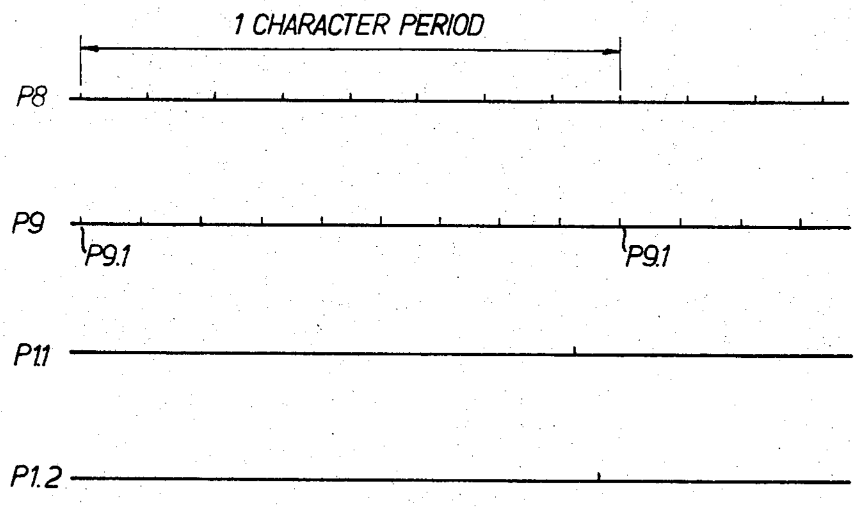

By way of example only, systems embodying the invention for converting 8-binary-digit unrestricted code signals into low disparity 9-digit signals will now be described in greater detail with reference to the accompanying drawings of which:

FIG. 1 shows, in block schematic form only, the transmitting terminal of a first system embodying the invention, FIG. 2 shows, in block schematic form only, the receiving terminal of the first system, FIG. 3 shows, in block schematic form only, the transmitting terminal of a second system embodying the invention, FIG. 4 shows, in block schematic form only, the receiving terminal of the second system, and, FIG. 5 is a pulse timing diagram illustrating the operation of the second system.

FIG. 1 shows the way in which the logical operations required at the transmitting terminal of the first system are performed. 8-digit code signals to be transmitted are applied, at a speed of C characters (i.e. groups of unrestricted binary digits) per second, to the input of a converter in the transmitter. Two streams of sampling pulses are used in the converter. One stream has a pulse repetition rate of C pulses per second, is designated PC, and has a pulse duration less than the duration of one digit. The other stream has a pulse repetition rate of 9C pulses per second, is designated P9C and has a pulse duration which is much shorter than that of one digit. The PC pulses are derived either from the device (not shown) which generates the binary input digits, or, by well known means, from the converter input and are timed to occur coincidentally with the digits of an 8-digit signal.

For convenience, it is proposed to attribute the values $+1$ and $-1$ respectively to the mark and space conditions of the binary signals. Thus, the disparity of an 8-digit code signal may lie between $+8$, when the signals contains 8 marks, and $-8$, when the signal contains 8 spaces. Other possible disparity values are $-6$, $-4$, $-2$, 0, 2, 4, and 6.

The 8-digit code signals are applied to the input of an 8-stage shift register indicated in FIG. 1 by block 1. The register is of known form and may comprise, for example, a chain of trigger circuits. Each stage of the register has a connection to a character disparity unit indicated by block 2. Connection to the shift register stages is made at a point in each stage at which there is a potential which indicates the polarity (i.e. +1 or −1) of the digit stored in the stage.

The character disparity unit is adapted to transmit a binary output to output lead 3, the output being of value −1 when the disparity of the stored signal is −8, −6, −4, −2 or 0, and of value +1 when that disparity is +2, +4, +6, or +8.

The output 3 from the character disparity unit forms one of two inputs to a multiplier circuit represented by block 4. The other input to multiplier 4 is received from an integrating circuit represented by block 5. The integrator 5 includes a counter which steps forward when a digit of mark polarity (+1) is applied to it and backward when a digit of space polarity (−1) is applied to it. The input to the counter is a stream of digits appearing on lead 6 and thus the counter indicates at any one moment the total disparity of digits which have appeared on lead 6 up to that moment. As will be described later the counter cannot exceed a total forward or backward movement of 13 indicating respectively a total positive disparity of +13 or a total negative disparity of −13.

The integrator 5 is arranged to provide an output condition on lead 7 of +1 when the total disparity recorded by the counter is positive and an output on lead 7 of −1 when that total is negative. If the total disparity is zero, it is desirable that both conditions are equi-probable. This may be achieved if the output condition for zero disparity is made dependent on the polarity of the disparity existing immediately before zero disparity was reached. For example, the output polarity for zero disparity may be the same as the polarity of the immediately previous disparity, or alternatively it may be opposite polarity. It will be obvious that either of these conditions of operation can be readily achieved by the inclusion of suitable logic circuits in the integrator 5.

A further alternative method of ensuring that when the total disparity recorded by integrator 5 is zero the output conditions +1 and −1 on lead 7 occur with equal frequency would be for these two conditions to occur alternately. This condition of operation also can readily be achieved by the inclusion of suitable logic circuits in integrator 5.

The inputs to multiplier 4 are combined in such manner that inputs of like polarity cause the multiplier to generate on lead 8 an output condition of +1 whilst inputs of unlike polarity produce the generation of an output condition of −1 on lead 8.

Lead 8 is connected as one input to two linear 2-gates 9, 10, the other input to those gates being the PC stream of pulses. The gates thus open only when PC pulses occur and opening coincides with one complete 8-digit signal in shift register 1. The output of multiplier 4 is transmitted through gate 9 (when opened) to an Eccles-Jordan trigger circuit shown as block 11 and sets the latter according to the polarity of that output. Trigger circuit 11 remains in its set condition until the succeeding PC pulse. The output of trigger circuit 11 is of a polarity opposite to that which set the circuit, that is, if the trigger circuit is set by a +1 condition then its output is −1 and vice versa.

Connected to receive the output of trigger circuit 11 is a further multiplier circuit indicated by block 12 to which is also connected the output of shift register 1. Multiplier 12 is similar to multiplier 4. On receipt of a −1 condition from trigger circuit 11, multiplier 12 inverts the polarity of each digit reaching it from shift register 1 and on receipt of a +1 condition from trigger circuit 11 multiplier 12 transmits such digits unchanged. Thus the disparity of the transmitted character is always opposite in polarity to the accumulated disparity recorded by integrator 5 at the conclusion of the preceding character. When a PC pulse closes gate 13, gate 10 opens to transmit the indicating digit. The polarity of that digit indicates whether the succeeding character has been inverted or not. If the character is sent erect, i.e. non-inverted, the indicating digit is of negative polarity whereas if the character is inverted the polarity is positive.

The output of multiplier 12 is joined to a further linear 2-gate 13 whose other input is the P9C pulse stream. Gate 13 also has an inhibition input consisting of the PC pulse stream. The gate 13 responds preferentially to the PC pulse, that is to say, the inhibiting PC pulse overrides the P9C pulse. To ensure this in practice it may be desirable for these PC pulses to be of longer duration, starting before and finishing after the corresponding P9C pulses. Lead 6 also receives the output of gate 10 at each PC pulse and is connected to a line transmit unit 14 which transmits to an output line 15 signals appropriate to that line.

The converter operates in the following manner, it being assumed that the total recorded disparity reached is negative, and that an 8-digit code signal of disparity −4 is then received.

The input digit stream is applied to the shift register 1 and examination of the disparity proceeds. When the complete 8-digit character occupies the stages of the shift register, a −1 condition is present on lead 3. At that time, integrator 5 has reached a negative disparity count and the condition present on lead 7 is −1. Thus, multiplier 4 receives a −1 condition on lead 3 and also on lead 7 so the condition appearing on lead 8 is +1. That condition is transmitted, during the PC pulse which occurs when the shift register is fully occupied, via gate 9 to trigger circuit 11 which transmits the condition of −1 to multiplier 12.

As the eight digits stored in shift register 1 appear successively at its output they are inverted in polarity by multiplier 12 and applied to gate 13. Gate 13 opens at every P9C pulse except that coinciding with a PC pulse when the inhibiting PC pulse closes the gate. At that instant gate 10 opens and transmits to line 6 a digit whose condition corresponds with the output of multiplier 4, i.e. in the present case +1. Thus, the indicating 9th digit is inserted at the beginning of the character. However, since gate 13 is opened at the P9C rate, successive digits appearing from the shift register are transmitted through gate 13 at progressively earlier instants. In that way time is made for the insertion of the 9th digit. There is a delay of one character because that is the time required to traverse the shift register.

Line signals are received by a line receive unit represented by block 17 which derives from the received signals, in known manner, sampling pulses for regenerating the digits. The regenerated digits are transmitted to a linear gate 18 and a multipltier indicated by block 19. A train of C pulses from a second input to gate 18 and the output of the gate is applied to an Eccles-Jordan trigger circuit shown in FIG. 2 as block 20. Trigger circuit 20 is adapted to produce an output condition which is the opposite of its input. Thus, if the output of gate 18 is +1, the output condition of the trigger is −1 and if the output of the gate is −1, the output of the trigger is +1. Once set, trigger circuit 20 remains in the same condition until the next C pulse. Multiplier 19 acts to invert the polarity of the signals it receives according to the polarity of the output condition of the trigger circuit 20. Thus if the trigger circuit output is −1, inversion takes place but does not take place if that output is +1.

Connected to the output of multiplier 19 is a linear gate 21 having an operate input consisting of a train of P9C pulses and an inhibit input comprising a train of PC pulses. The inhibiting input serves to prevent the onward transmission, to a digit store shown as block 22, of the first digit only of each 9-digit signal. Thus, the signal stored is that applied, in the transmitter, to shift register 1. From the store, digits may be applied directly to a decoder (not shown), or, if they are to be transmitted onwards as unrestricted binary digit signals, they are read out by a pulse train of repetition rate 8C per second.

In the transmitting terminal shown in FIG. 3 the 8-digit code signals are again applied at a speed of C characters per second to a shift register indicated generally at 23. Each stage of the register is, as before connected to a character disparity unit 24.

Two streams of sampling pulses are used one of which has a pulse repetition rate of 8C pulses per second and is designated P8 while the other pulse stream has a pulse repetition rate of 9C pulses per second and is designated P9. The P8 pulses are derived either from the device (not shown) which generates the stream of binary input digits, or, by well known means from the input stream to the shift register and are timed to occur coincidently with the digits of an 8-digit signal. Also required are two further pulse streams designated P1.1 and P1.2, the pulses of which occur once per character. The P1.1 pulses occur before the P1.2 pulses, but both occur in the interval between the P9 pulse which coincides with the end of one character and the P9 pulse which coincides with the beginning of the next character.

The P8 pulses control the input, operation and stepping of shift register 23.

Let it be assumed that the potential of the point in each stage of shift register 23 which is connected to character disparity unit 24 will, except when digits are being transferred from stage to stage, be +V1 when the stored digit is +1, and of a different value +V2 when the stored digit is −1. The points on the stages of the shift register are joined via resistors 25 to a common point 26 itself joined by a resistor 27 to a potential +V2. Resistors 25 are of equal resistance which is equal to that of resistor 27. A further resistor 25 is connected permanently to a source of potential +V1. Point 26 is connected to the input of a linear gate 28 which is opened by pulses P1.2 to allow the potental at point 26 to be fed to an Eccles-Jordan trigger circuit represented by block 29.

The voltage of point 26 depends upon the disparity of the code signal stored in the shift register. If four or more of the stages of the register contain +1 digits, the potential of point 26 will be between V1 and $$\frac{V1+V2}{2}$$

If fewer than four stages contain +1 digits, then the potential of point 26 will be between V2 and $$\frac{V1+V2}{2}$$

The Eccles-Jordan trigger circuit 29 is arranged to give an output condition of +1 when the potential of point 26 is between V1 and $$\frac{V1+V2}{2}$$

and an output condition of −1 when the potential of point 26 is between V2 and $$\frac{V1+V2}{2}$$

The output of trigger circuit 29 forms one of the two inputs to a multiplier represented by block 30. The other input to the multiplier 30 is received from an integrator indicated by block 31. The integrator includes a counter which steps forward when a digit of mark polarity (+1) is applied to it and backward when a digit of space polarity (−1) is applied to it. The input of the counter comprises a stream of digits appearing on lead 32 and thus the counter indicates at any one moment the total disparity of digits which have appeared on lead 32 up to that moment. It will be apparent from what follows that the counter cannot exceed a total forward or backward movement of 13 indicating respectively a total positive dispartity of +13 or a total negative disparity of −13.

The integrator is arranged to provide an output condition of +1 when the total disparity recorded by the counter is positive and an output condition of −1 when that total is negative. If the total disparity is zero, it is desirable that both conditions are equi-probable. That may be achieved by one of the methods described above in connection with FIG. 1.

The inputs to multiplier 30 are combined in such manner that inputs of like condition cause the multiplier to generate an output condition of +1 whilst unlike inputs produce an output condition of −1.

The output of multiplier 30 is applied as an input to a trigger circuit 33 which delivers an output signal of −1 when the input signal is +1, and an output signal of +1 when the input signal is −1. This output is fed to multiplier 34.

Each stage of the shift register 23 is connected via a gate to a corresponding stage in a nine stage shift register 35. All the gates are controlled by a common pulse lead carrying the P1.1 or the P1.2 pulses. The ninth stage, designated I, of register 35 is placed ahead of that stage corresponding to stage number 1 of the register 23. The pulse lead is connected directly to the additional stage so that the same digit condition is written into this stage at each occurrence of a gating pulse. The shift register 35 is stepped by the P9 pulses, operating through a delay element indicated by block 36 which introduces a delay of small fraction of a P9 pulse duration. The output of the register is passed via a linear gate 37 opened by P9 pulses to the multiplier 34. The output of multiplier 34 appears on lead 32 which is connected via a line transmit unit shown as block 38 to an output circuit 39. The line transmit unit converts the signals on lead 32 to a form appropriate to the nature of the circuit 39.

The manner of operation of the converter shown in FIG. 3 will now be described, it being assumed that an 8-digit code signal of disparity −4 is being received, and that the total disparity already reached is negative.

The 8-digit signal is stored in the shift register 23 and its disparity examined in the manner described above by the character disparity unit 24. The signal is found to have a disparity of −4 giving a net disparity of −3 as seen as point 26, so that the potential of point 26 is between V2 and $$\frac{V1+V2}{2}$$

and the trigger circuit 29 applies to multiplier 30 the condition of −1, at the time of occurrence of the P1.2 pulse. Just before this occurs, trigger 33 has been reset by pulse P1.1.

Integrator 31 has reached a disparity count such that the condition applied to multiplier 7 from the integrator is also −1 and thus the output condition of multiplier 30 is +1. That condition is transmitted, at the instant of occurrence of the P1.2 pulse to trigger circuit 33 which transmits a −1 condition to multiplier 34.

The 8-digit code stored in shift register 1 is transferred in parallel at time P1.1 or P1.2 to the shift register 35 and at the same time an additional digit, always of the same polarity, is written into the additional stage I. The contents of register 35 are read out by the ensuing frame of P9 pulses, via the linear gate 37 to the multiplier 34. The added digit in stage I of register 35 is the first to be read out and is followed by the remaining eight in the same order as that in which they are received by shift register 1. Because a signal −1 exists on the other input lead to the multiplier 34, the signals fed into it from linear gate 37 will appear on lead 32 in inverted form and will be so transmitted to the output circuit 39 via unit 38. Because the disparity of the received character was negative that of the transmitted character will be positive, thus tending to reduce the cumulative disparity. The transmitted signal is fed also to integrator 31 thereby causing output of the latter to be adjusted to correspond with the sense of the new cumulative disparity.

It will be appreciated that while the digits of an 8-digit character are being received in shift register 23 the digits of the preceding character, themselves preceded by the additional indicating digit, are being read out of shift register 35. Thus the device introduces a delay of one character period.

The polarity of the added digit from stage I of register 35 indicates whether the polarity of the digits forming the following signal have been inverted and is used in a receiving terminal now to be described to effect a reinversion where necessary.

Line signals from the transmitter shown in FIG. 3 are received by a line receive unit, FIG. 4, represented by block 40 which derives from the received signals, in known manner, streams of pulses P9 and P9.1 for regenerating the digits. The regenerated pulses are transmitted to a linear gate 41 and a multiplier indicated by block 42. Linear gate 41 is controlled by the initial pulse P9.1 only of each frame of P9 pulses and the gate therefore opened to pass to a trigger 43 the polarity of the indicating digit of each group of character digits. Trigger 43 is so arranged that if the polarity of the indicating digit fed to it indicates that reversal has been effected at the transmitter, it feeds a negative signal to multiplier 42. This signal, which persists until the state of trigger 43 is reversed by some later indicating digit, causes the signals appearing at the output of multiplier 42 to be opposite in polarity to those at its input. Thus the original polarity of the signals has been restored. The signals are passed to a linear gate 44 which is opened at each character digit time but is closed at indicating digit time so that only the character digits are passed to pulse store 45. The signals may be read out from the store and applied to a decoder (not shown) or, if they are to be transmitted onwards as unrestricted binary digit signals they are read out by pulse train having eight pulses per character.

The systems have been described with reference to a group of 8 unrestricted binary digits. The principle can be applied to a group of any number of digits, but some means of identifying the indicating digits is necessary. This is conveniently achieved, in the case of a multichannel pulse code modulation system transmitting a "frame" consisting of a number of time slots of equal time duration (i.e., equal number of digits), by making the group equal to the number of digits in a time slot. If the input digit stream is not already in groups containing equal numbers of digits, with means for identifying the commencement of a group, the transmitting equipment which is the subject of this invention may divide the stream into arbitrary groups of length determined by the number of stages in the shift register. It must also transmit to the receiver means for identifying the commencement of a group. This might, for example, take the form of a recognisable further digit added to each group. The added digits may be rendered recognisable by transmitting them with alternate polarity in successive groups, the receiver being provided with circuitry for detecting this alternation.

The system has another possible advantage when time division multiplex electronic exchanges are used. It is convenient to have a spare digit time period after each time slot, to give time for switching operations within the exchange. This can be provided easily with the proposed system by not retiming the received signals with a slower clock as described above. The 9th digit period will then remain, and will provide the switching time required for the exchange. At the outgoing side of the exchange, the control digit required for the next transmission link (assuming that this link is also working with the low disparity system described), can be inserted in the 9th digit position, so that no retiming with a faster clock is necessary at this point.

With this code, a nine-digit group can give disparity values of 1, 3, 5, 7 or 9, in each case either plus or minus (marking or spacing), and changing the sign of the control digit will merely reverse the sign of the disparity. Since each group will always (as the system has been described) reduce the accumulated disparity existing at its commencement, it follows that the maximum possible accumulated disparity at the conclusion of a character is 9, produced when a 9-disparity group follows zero accumulated disparity. The condition under which this disparity will take longest to be reduced to zero is when the group giving a disparity of 9 is followed by a succession of groups with a disparity of 1. 9 such groups would be required to reduce the disparity to zero. This is the factor which will determine the lowest frequency for which the input transformers of the repeaters must be designed.

Furthermore, when an accumulated disparity of 9 is produced as indicated above, the disparity of the next following character must be of opposite polarity. It cannot therefore contain more than four digits of the same polarity as that of the accumulated disparity of 9. If it does contain four such digits and these are the first four digits of the character, the integrator will reach a total disparity count of 13 before it starts to fall again. This is the maximum count, either positive or negative, which the integrator can reach.

I claim:

1. A transmission system for binary coded digital signals comprising a transmitter and a receiver; said transmitter having an input connection to which binary coded input signals are applied and an output on which appear binary coded output signals corresponding to said binary coded input signals, said transmitter comprising, a signal converter by which said binary coded input signals are received, a disparity valuing circuit in said converter for determining the disparity values of successive groups of said binary coded input signals, a second disparity valuing circuit for summing the disparity value of said binary coded output signals appearing on said output, a polarity inverting circuit in said converter for inverting the polarity of each digit of a group of binary coded input signals in the event only that the disparity value of said group of inverted polarity when added to said summed disparity values reduces the latter, means for transmitting a further digit with each said group which indicates if the polarity of the group has been inverted; and said receiver having an input to which groups of signals appearing at said transmitter output are applied, said receiver including digit sensing means for sensing said further digit, and polarity restoring means connected to said digit sensing means for restoring the polarity of any received signal group including a further digit.

2. A transmission system as claimed in claim 1 and further comprising, in said receiver, a receive unit connected to receive said binary coded output signals appearing at the output of said transmitter, gating means connected to the output of said receive unit to gate into said digit sensing means said further digit, and, connected to the output of said polarity restoring means, further gating means to gate out said further digit.

3. A transmission system for binary coded digital signals comprising a transmitter and a receiver; said transmitter including a signal store for temporarily storing, in succession, groups of binary coded signals to be transmitted, a first disparity valuing circuit connected to said store for determining the disparity value of a stored group, a polarity inverting circuit connected to receive signals from said store for inverting the polarity of each digit of selected groups of digits from said store, a digit adding circuit interconnected between said polarity inverting circuit and an output lead, a second disparity valuing circuit for summing the disparity values of groups of signals appearing on said output lead, disparity value comparing means connected to said first and second disparity valuing circuits and for rendering operative said polarity inverting circuit only in the event that the disparity value of said stored signal group increases the summed disparity values, said disparity comparing means also causing said digit adding circuit to add a polarity inversion indicating digit to each said selected group; and said receiver comprising digit sensing means for sensing said polarity inversion indicating digit, and polarity restoring means connected to said sensing means for restoring the polarity of each said selected group.

4. A transmission system for binary coded digital signals comprising a transmitter and a receiver; said transmitter including a signal store for temporarily storing in succession groups of binary coded signals to be transmitted, a first disparity valuing circuit connected to said store for determining the disparity value of a stored group, a polarity inverting circuit connected to receive signals from said store to invert the polarity of each digit of selected groups from said store, a digit adding circuit in said store, an output lead connected to said polarity inverting circuit, a second disparity valuing circuit for summing the disparity values of groups of signals appearing on said output lead, disparity value comparing means connected to said first and second disparity valuing circuits and for rendering operative said polarity inverting circuit only in the event that the disparity value of said stored signal increases the summed disparity values, said disparity comparing means also causing said digit adding circuit to add a polarity inversion indicating digit to each said selected group; and said receiver comprising digit sensing means for sensing said polarity inversion indicating digit, and polarity restoring means connected to said sensing means for restoring the polarity of each said selected group.

5. A transmission system as claimed in claim 4 and further comprising, in said signal store, a first shift register connected to receive, in succession, said groups of binary coded signals and having a number of stages equal to the number of digits in said groups, a second shift register having stages corresponding to the stages of said first register and an additional stage, a transfer circuit interconnecting each stage of said first register with the corresponding stage of said second register for transferring digits stored in said first register to said second register, said additional stage in said second register comprising said digit adding circuit, a transfer initiating lead connected to said transfer circuit and a read-out control lead connected to said second shift register.

References Cited

UNITED STATES PATENTS

| | | | |
|---|---|---|---|
| 2,995,618 | 8/1961 | Van Duuren et al. | 178—69 X |
| 2,996,578 | 8/1961 | Andrews | 178—69 X |
| 3,048,819 | 8/1962 | Helder et al. | 340—146.1 |
| 3,172,952 | 3/1965 | Lentz | 328—57 X |

MALCOLM A. MORRISON, *Primary Examiner.*

C. E. ATKINSON, *Assistant Examiner.*